US012767192B2

(12) United States Patent
De Angelis

(10) Patent No.: US 12,767,192 B2
(45) Date of Patent: Oct. 20, 2026

(54) ARCHITECTURE FOR A DATA TRANSMISSION BETWEEN A PLURALITY OF ELECTRIC TRACTION VEHICLES AND A CORRESPONDING REMOTE CONTROL CENTER

(71) Applicant: GEMATICA S.R.L., Naples (IT)

(72) Inventor: Marco De Angelis, Naples (IT)

(73) Assignee: GEMATICA S.R.L., Naples (IT)

( * ) Notice: Subject to any disclaimer, the term of this patent is extended or adjusted under 35 U.S.C. 154(b) by 0 days.

(21) Appl. No.: 19/132,544

(22) PCT Filed: Dec. 5, 2023

(86) PCT No.: PCT/EP2023/084358
§ 371 (c)(1),
(2) Date: May 23, 2025

(87) PCT Pub. No.: WO2024/121155
PCT Pub. Date: Jun. 13, 2024

(65) Prior Publication Data
US 2026/0200511 A1 Jul. 16, 2026

(30) Foreign Application Priority Data
Dec. 6, 2022 (EP) .................................... 22425057

(51) Int. Cl.
*B61L 15/00* (2006.01)
*H04B 3/54* (2006.01)

(52) U.S. Cl.
CPC ............ *B61L 15/0036* (2013.01); *H04B 3/54* (2013.01)

(58) Field of Classification Search
CPC .............................. H04B 3/54; B61L 15/0036
(Continued)

(56) References Cited

U.S. PATENT DOCUMENTS 9,917,773 B2 * 3/2018 Cooper .................... H04B 3/00
9,994,241 B2 * 6/2018 Fischer ............... B61L 15/0036
(Continued)

OTHER PUBLICATIONS

Hatem Belhassen, et al., "Proof of Concept of Vehicle to Infrastructure Power Line Communicaton Link for Tramway CCTV", IEEE Intelligent Transportation Systems Magazine, IEEE, vol. 13, No. 3, pp. 89-98, 2020.
(Continued)

*Primary Examiner* — Hai H Huynh
(74) *Attorney, Agent, or Firm* — LUCAS & MERCANTI, LLP

(57) ABSTRACT

An architecture configured to transmit data between a plurality of electric traction vehicles moving in a transport network is described. The architecture includes a transmission and decoupling system inserted between the vehicles and substations connecting with the power supply network being used for a continuous data transmission according to the BPLC communication mode on the vehicles and the backbone ethernet network. The transmission and decoupling system includes an onboard device placed onboard each vehicle and configured to connect to one of the grounded devices when the vehicles transit in correspondence of the grounded device and a plurality of grounded devices. Each grounded device is adapted to be coupled to at least one of the substations and includes an adapter which is directly connected to the ethernet backbone network and is a PLC master device. The onboard device of each vehicle includes an adapter being a PLC slave device.

20 Claims, 5 Drawing Sheets

(58) Field of Classification Search
USPC ....................................................... 701/19, 20
See application file for complete search history.

(56) References Cited

U.S. PATENT DOCUMENTS

| | | | | |
|---|---|---|---|---|
| 2011/0284699 | A1 | 11/2011 | Cooper et al. | |
| 2012/0325980 | A1 * | 12/2012 | Noffsinger | H04L 49/40 246/219 |

OTHER PUBLICATIONS

Ricardo Perez-Guzman, et al., "Communications Improvements for Intelligent Systems in Microgrids—Part I", IEEE International Conference on Electrical Systems for Aircraft, Railway, Ship Propulsion and Road Vehicles & International Transportation Electrification Conference (ESARS-ITEC), IEEE, pp. 1-6, 2018.

International Search Report and Written Opinion for Corresponding International Application No. PCT/EP2023/084358, Mar. 5, 2024, 13 pages.

* cited by examiner

ARCHITECTURE FOR A DATA TRANSMISSION BETWEEN A PLURALITY OF ELECTRIC TRACTION VEHICLES AND A CORRESPONDING REMOTE CONTROL CENTER

CROSS-REFERENCE TO RELATED APPLICATIONS

This application is a 371 of PCT/EP2023/084358, filed Dec. 5, 2023, which claims the benefit of European Patent Application No. 22425057.1, filed Dec. 6, 2022.

FIELD OF THE INVENTION

The present invention refers to an architecture for a data transmission between a plurality of vehicles and a remote control center of a transport network.

The invention refers in particular, but not in an exclusive way, to an architecture for a data transmission for the communication in a mass transport network, such as the railway or underground network and the following description is made with reference to this field of application with the sole purpose of simplifying the exposition thereof.

BACKGROUND OF THE INVENTION

As is well known, in the field of the so-called mass transport, systems based on the usage of electrical motors are widely used. Said systems defined as with electric traction are nowadays the technologically most advanced ones.

In particular, all the recently built high-speed railways and most of the underground lines are made by electric traction systems.

The main reasons for the success of the electric traction systems, particularly in the field of the mass transport, are their electromechanical reliability and the greater operation affordability in particular during intense traffic conditions, in addition to the lower produced environmental pollution. There are also suitable devices which allow to recover energy when going downhill or during deceleration or braking steps which further improve the performance of these systems.

In its most general form, an electric traction mass transport system comprises a plurality of vehicles adapted to accommodate a plurality of passengers, or vehicles, moved on suitable tracks and an electric power supply line which is able to supply power to said vehicles; said system being also indicated as transport network.

Most of the transport networks use a so-called overhead electrical power supply line, wherein the vehicles are provided with pantograph structures for the connection to electrical power supply cables above the tracks. In particular, the term pantograph defines a device which takes electric current from an overhead contact line, generally placed on the roof of a vehicle such as a railway or tramway vehicle.

Alternatively, it is known the use of a so-called third rail power supply, wherein an added rail is placed in between or beside the two tracks or rails on which the vehicle transits, such as a train or an underground carriage, the electrical contact being ensured by a shoe which slides or a lateral wheel which rotates thereon, suitable isolating coverings being provided for protecting possible workers on the tracks.

One of the problems which should be dealt with in managing a transport network of the indicated above type is the data transmission, in particular between single transport means which circulate in the network and a control center thereof.

Said data transmission is usually assigned to designated data networks, comprising transmissive supports with optical fiber and copper cable which are inserted in system infrastructures along the transport network, used in particular for transmitting data related to the circulating vehicles in addition to company communications of the administrative and management type. Currently in Italy, the railway data network covers more than 12,000 Km of railway lines and constitutes the fundamental support for all the railway transmission systems.

It is known to use the GSM-R, that is a radio communication system for transport networks which is standardized at European level and offers a wide range of voice, SMS and data services necessary for guaranteeing the interoperability and the regular operation of the transport networks as a whole. At the end of 2021, Italy had a coverage equal to 11,633 Km of national railway lines (traditional and HS/HC ones, that is high-speed/high-capacity) with GSM-R signal, the coverage of the remaining portion of railway line being guaranteed by roaming with mobile telephony operators.

Obviously, also the fixed telephony lines are used in managing the transport lines. In particular, the fixed telephony system is used by the circulation and maintenance operators for the communications related to the railway operativity. Furthermore, designated telephone stations are present on the desks of the circulation operators, such as station masters (DM from Italian: “dirigenti movimento”), train dispatchers (DC from Italian: “dirigenti centrali”) and operational train dispatchers (DCO from Italian: “dirigenti centrali operativi”), in the electric traction (ET) desks, such as cabs, electric substations (ESS), DOTE central desks, in the station yards and along the lines, outdoors or in a gallery.

In the last years, said communication systems are moving from traditional telephone systems to IP networks and VoIP systems.

A communication system for a consist, such as for example a train, is described in patent No. U.S. Pat. No. 8,825,239 B2 issued on Sep. 2, 2014 in the name of General Electric Company, said system being not anyway able to allow a continuous data transmission when the consist is moving.

Also known from the article to Belhassen Hatem et al. entitled: “Proof of Concept of Vehicle to Infrastructure Power Line Communication Link for Tramway CCTV”, IEEE INTELLIGENT TRANSPORTATION SYSTEMS MAGAZINE, vol. 13, no. 3, Mar. 3, 2020 is a PLC communication in vehicles.

In the most modern transport networks, wired data transmission modes are generally used especially for the stations, and wireless ones in particular for the communication between moving vehicles and a corresponding remote control center.

However, the presence of moving vehicles makes the performances of the wireless communications not fully deterministic, as well as requires the installation of designated apparatuses placed along the line driven through by the vehicles, said additional apparatuses causing a significant economic and also environmental impact, in particular because of the needed presence of transmission antennas.

It is therefore an aim of the present invention is to provide an architecture for the continuous data transmission in a transport network comprising a plurality of vehicles moving on tracks to which power is supplied by a low/medium voltage power supply line and which are in communication with a remote control center, having structural and functional characteristics so as to guarantee a transmission which is always reliable, without interruptions and with low additional costs, overcoming the limits and drawbacks which are still affecting the solutions made according to the prior art.

SUMMARY OF THE INVENTION

According to the present invention the BPLC communication mode (Broadband over Power Lines Communication) is modified to allow the continuous data transmission between vehicles moving in a transport network and a remote control center using the low/medium voltage power supply line of the same vehicles, the term low/medium voltage meaning a voltage value lower than 30 kV.

An exemplary architecture for a data transmission between a plurality of electric traction vehicles moving in a transport network and an ethernet backbone network according to the present invention, the transport network may comprise a plurality of substations connecting with a low/medium voltage power supply network for the vehicles, characterized in that the power supply network is used for a continuous data transmission according to the BPLC communication mode on the vehicles and the backbone ethernet network by a transmission and decoupling system inserted between vehicles and substations connecting with the power supply network, said transmission and decoupling system comprising:

- an onboard device, adapted to be placed onboard each vehicle; and
- a plurality of grounded devices, each grounded device being adapted to be coupled to at least one of the substations,
- the onboard device being able to connect to one of the grounded devices when the vehicles transit in correspondence of said grounded device
- wherein each of the grounded devices comprises at least an adapter, which is directly connected to the ethernet backbone network and is a PLC master device; and the onboard device of each vehicle comprises an adapter being a PLC slave device.

More in particular, the invention comprises the following additional and optional features, taken singularly or, if necessary, in combination.

According to an aspect of the invention, the onboard device can be connected to the grounded device based on a signal/noise ratio adapted to guarantee a bidirectional communication with the ethernet backbone network.

Moreover, the onboard device can be connected to the grounded device based on additional link quality parameters, chosen among an authentication status of master and/or slave PLC modules, RSSI (Received Signal Strength Indication) of a beacon frame between a master PLC module and a slave PLC module, an AGC (Automatic Gain Control) on a RxPGA (Receiver's Programmable Gain Amplifier), being used to compensate an amplitude of a signal received from the receiver, and a physical data rate based on the data dynamically exchanged on an estimated channel between a master PLC module and a slave PLC module.

According to another aspect of the invention, the adapter includes at least one first PLC module of a first type and a second PLC module of a second type connected to a management module with gateway function, said adapter being adapted to convert digital data in an analog radiofrequency signal and being connected to a low/medium voltage local power supply line of the vehicle and to the grounded device when connected to said onboard device.

According to said aspect of the invention, the onboard device of each vehicle can further comprise a decoupler adapted to eliminate a continuous component of a power supply voltage on the local power supply line and to realise a high-pass filter to eliminate low-frequency noise in an input signal and obtain an information signal to be transmitted to the grounded device when connected to the onboard device, enabling a connection with the power supply network and a data transmission according to the BPLC communication mode towards the backbone ethernet network.

According to another aspect of the invention, the decoupler can be a passive component and the adapter can be an active component.

According to still another aspect of the invention, the onboard device can be connected to a local network of the vehicles.

According to another aspect of the invention, the architecture for a data transmission can comprise a plurality of grounded devices of a first type and a plurality of grounded devices of a second type which are alternating and spaced with respect to each other according to a distance.

More in particular, each of the grounded devices of the first type can comprise at least one adapter, in turn including a PLC module of the first type and a corresponding management module which is able to connect to the first PLC module of the first type of the adapter of the onboard device and each of the grounded devices of the second type can comprise at least one adapter, in turn including a PLC module of the second type and a corresponding management module which is able to connect to the second PLC module of the second type of the adapter of the onboard device.

According to another aspect of the invention, the grounded devices of the first type and of the second type can respectively comprise a management module connected to the PLC modules of the first type and of the second type.

According to still another aspect of the invention, each of the grounded devices can comprise a decoupler adapted to eliminate a continuous component from a power supply voltage and realise a high-pass filter to eliminate a low frequency noise in an input signal and obtain an information signal to be transmitted to the onboard device.

According to another aspect of the invention, each of the grounded devices can further comprise a connector block and grounding devices.

According to still another aspect of the invention, the decoupler can be a passive component and the adapter can be an active component.

Furthermore, according to another aspect of the invention, the substations can be chosen among the railway or tramway stations, railway or tramway stops, electrical substations of railway or tramway networks, additional structures positioned along railway or tramway lines.

Furthermore, the vehicles can be chosen among trains, trolleybus, trams and other electric traction transport means.

According to another aspect of the invention, the grounded devices can be placed at a distance comprised between 1 m and 1500 m from the onboard devices of the vehicles.

Furthermore, according to still another aspect of the invention, the architecture for a data transmission can carry out a data handover from a grounded device to a following one by verification of a minimum value of signal/noise ratio transmitted between the grounded device and the onboard device.

According to another aspect of the invention, the architecture for data transmission can transmit:

critical data, that is data which are necessary for a correct working of the vehicles and the transport network as a whole; and non-critical data, that is data connected to an improved passengers comfort onboard the vehicles.

The technical problem is also solved by a method for the continuous data transmission in an architecture made as indicated above, wherein the grounded devices are divided and alternating with respect to each other between a first type and a second type, each device type being adapted to be connected to a distinct module of the onboard device, the method comprising the steps of:

transmitting a signal from each of the modules of the onboard device towards grounded devices of the same type;

verifying a signal/noise ratio value of the transmitted signals as link quality parameter;

selecting a signal with a maximum value of signal/noise ratio among the transmitted signals; and connecting one of the modules of the onboard device with one of the grounded devices which correspond to said signal with a maximum value of signal/noise ratio, said steps being repeated in following times while the vehicle is moving in order to guarantee the continuous data transmission.

According to an aspect of the invention, additional link quality parameters can be used to evaluate the grounded device to be connected to one of the modules of the onboard device.

In particular, the additional link quality parameters can be chosen among an authentication status of master and/or slave PLC modules, RSSI (Received Signal Strength Indication) of a beacon frame between a master PLC module and a slave PLC module, an AGC (Automatic Gain Control) on a RxPGA (Receiver's Programmable Gain Amplifier), being used to compensate an amplitude of a signal received from the receiver, and a physical data rate based on the data dynamically exchanged on an estimated channel between a master PLC module and a slave PLC module.

According to another aspect of the invention, handover rules can be used to drive the handover mechanism, chosen among a time of evaluation of the link quality parameters; a time between two scans, being a frequency of information retrieved from slave modules of grounded devices and roaming estimation; a no-return delay, being a minimum delay before returning to an already used master module; and a smoothing factor, being a weighing importance of latest signals vs older ones.

According to a further aspect of the invention, different combination of the handover rules and additional link quality parameters can be used on the basis of the application scenario.

The characteristics and advantages of the architecture for a data transmission according to the invention will be evident from the description, made herein in the following, of an embodiment example thereof given by way of an indicative and non-limiting example with reference to the attached drawings.

DETAILED DESCRIPTION OF THE INVENTION

Figure 1:
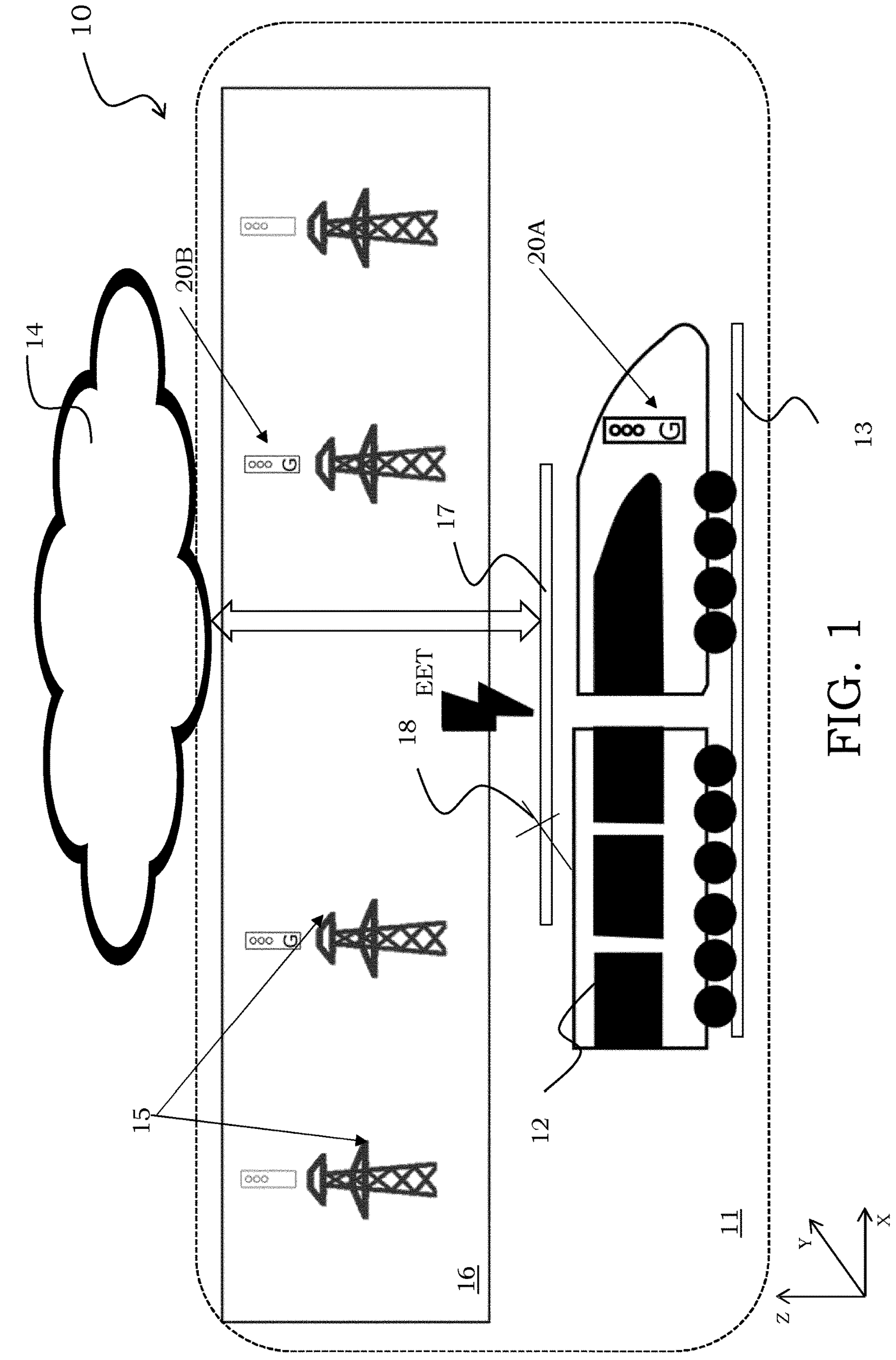
FIG. 1 schematically shows an architecture for a data transmission for a transport network comprising a plurality of moving vehicles made according to the invention.

With reference to said FIGURES, and in particular to FIG. 1, an architecture for a data transmission made according to the present invention is generally and schematically indicated with 10.

It should be noted that the FIGURES represent schematical views of the architecture according to the invention and are not drawn to scale, but are instead drawn so as to emphasize the important characteristics of the invention. Furthermore, the different aspects of the invention represented in the FIGURES by way of example can be obviously combined with each other and interchanged from one embodiment to another one.

The architecture for a data transmission 10 is particularly adapted to connect a plurality of vehicles 12 moving in a transport network 11, for example along the tracks 13, with a network 14 of the so-called backbone or grounded type, that is a network interconnecting with other LAN subnetworks for exchanging information between said LAN subnetworks, in particular an ethernet network, the transport network 11 comprising a plurality of substations 15 connecting with a low/medium voltage power supply network 16 used to provide electric traction energy EET to the vehicles 12 and to local power supply lines 17 connected to the vehicles 12, for example in the form of overhead power supply lines, each vehicle 12 being provided with a pantograph 18 for the connection with said local power supply lines 17. It is likewise obviously possible to use vehicles 12 with third rail power supply, the low/medium voltage power supply network 16 being adapted to provide the electric traction energy to the vehicles 12 by said third rail, supplementary to the tracks 13, the third rail being therefore essentially a local power supply line. It is pointed out that the term low/medium voltage means a voltage value lower than 30 kV.

Suitably according to the present invention, the power supply network 16 is also used for the continuous data transmission between the vehicles 12 and the ethernet backbone network 14, in particular using the BPLC communication mode (Broadband over Power Lines Communication).

The present invention in fact starts from the consideration that said electric line broadband BPLC communication mode allows the digital data transmission at relatively high speed, using the public cabled network for electric energy distribution. In order to apply said BPLC communication mode to a transport network, the following critical aspects have been advantageously faced and overcome:

making the data communication compatible with a low/medium voltage power supply network such as the power supply network 16 of a transport network 11; and guaranteeing the connection in highly time-varying and dynamic conditions, because of the movement of the vehicles 12 on the tracks 13 of the transport network 11 and the exchanged information, which can vary in a defined time interval.

In order to overcome these difficulties, the architecture for a data transmission 10 was advantageously provided with a transmission and decoupling system 20 inserted between the vehicles 12 moving in the transport network 11 and the substations 15 connecting with the power supply network 16 and particularly comprising:

- an onboard device 20A, adapted to be placed onboard each vehicle 12 of the transport network 11; and
- a plurality of grounded devices 20B, each grounded device 20B being adapted to be coupled to at least one substation 15 connecting with the power supply network 16.

The architecture for a data transmission 10 comprises the ethernet backbone network 14 which is in bidirectional communication with the transmission and decoupling systems 20 of the vehicles 12 and allows the continuous bidirectional data transmission between said vehicles 12 and the ethernet backbone network 14.

Figure 2:
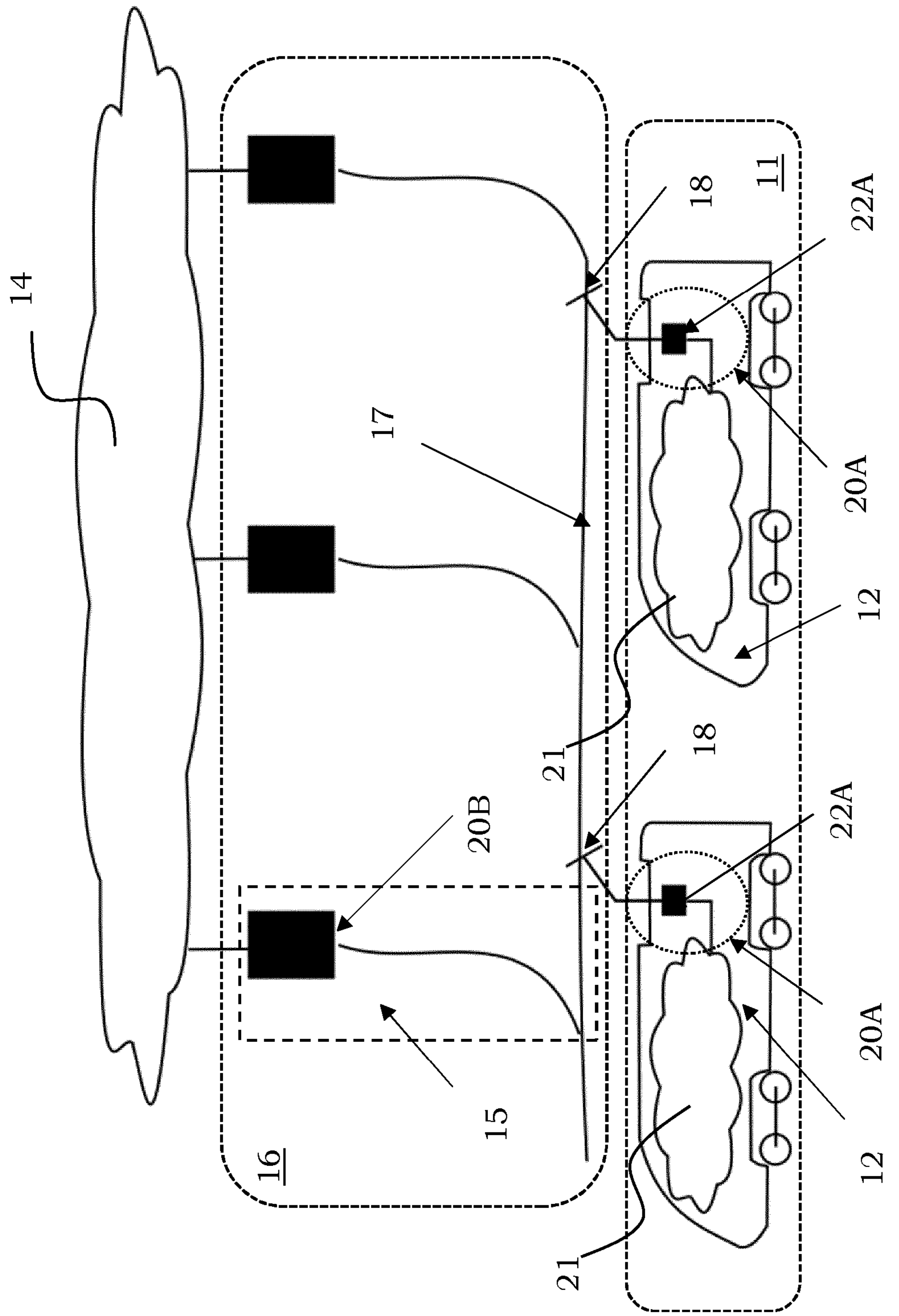
FIG. 2 shows more in detail the architecture of FIG. 1.

Suitably, as schematically shown in FIG. 2, the onboard device 20A of each vehicle 12 comprises a decoupler 22A, which is a passive component connected to a local network 21 and to the grounded device 20B of the substations 15, via the local power supply line 17 which provides the electric traction energy EET to the same vehicle and is connected to the power supply network 16. Analogously, it would be possible to connect the decoupler 22A of a vehicle with third rail power supply to the grounded device 20B by connection via said third rail acting as local power supply line.

Suitably, the substations 15 where the grounded device 20B is to be installed can be chosen for example among the railway or tramway stations, railway or tramway stops, electrical railway or tramway substations or other structures positioned along the railway or tramway line.

Analogously, it is possible to install the onboard device 20A for example on trains, trolleybus, trams and other similar transport means.

Figure 3:
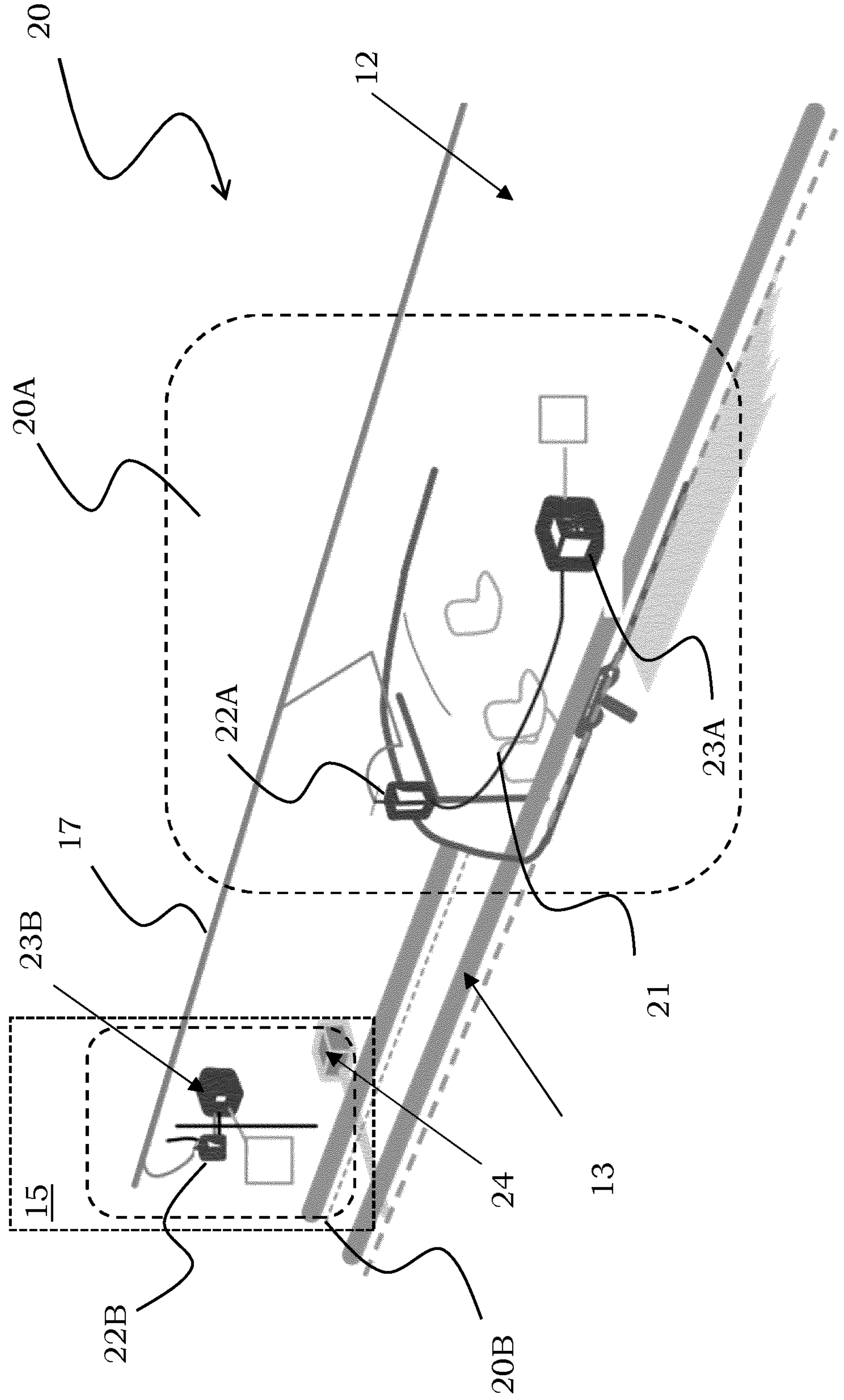
FIG. 3 shows a system used by the architecture of FIG. 1 having a grounded portion and an onboard portion of a vehicle moving in the transport network.

More in detail, as schematically shown in FIG. 3, the onboard device 20A comprises the decoupler 22A to enable the connection with a low/medium voltage power supply line such as the local power supply line 17 of the vehicles 12 and the data transmission according to the BPLC communication mode by the power supply network 16.

The onboard device 20A furthermore comprises an adapter 23A, which is an active component for the conversion of digital data in an analog radiofrequency signal to be sent to the decoupler 22A and, via the grounded device 20B, to the ethernet backbone network 14.

In particular, the decoupler 22A eliminates the continuous component of the power supply voltage on the local power supply line 17 and allows it to be connected with the adapter 23A.

It is possible to install the passive component, that is the decoupler 22A outside the vehicle 12, for example on the roof of the vehicle if power is supplied by pantograph or under its fairing in case of third rail power supply, while the active component, that is the adapter 23A is usually housed inside the same vehicle, for example inside a carriage.

Analogously, the grounded device 20B comprises a decoupler 22B (passive component), also used to eliminate the continuous component from a power supply voltage and an adapter 23B (active component) for the conversion of digital data in an analog radiofrequency signal to be sent to the ethernet backbone network 14. Thereby, advantageously, antennas along the tracks 13 of the transport network 11 are not needed, the communication being made by the power supply network 16 and the ethernet backbone network 14.

In other words, the onboard device 20A comprises the decoupler 22A (passive component) and the adapter 23A (active component) and, analogously, the grounded device 20B comprises the decoupler 22B (passive component) and the adapter 23B (active component).

The grounded device 20B can also comprise a junction box 24 of the power supply along a track 13 and possible other grounding devices (not shown).

Suitably, the decouplers 22A and 22B of the onboard device 20A and of the grounded device 20B, respectively, can be made equal to each other.

Figure 4:
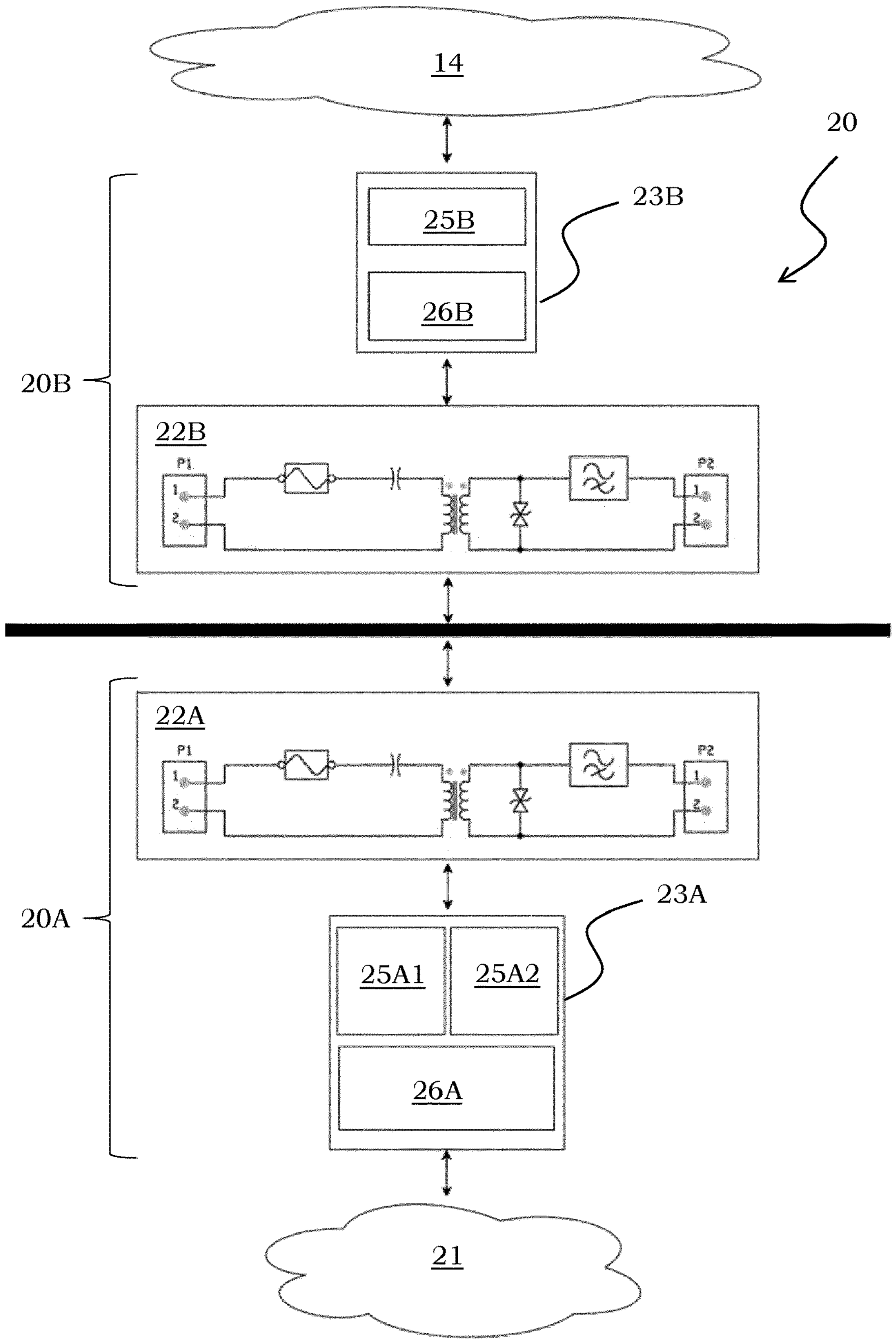
FIGS. 4 and 5 show more in detail the system of FIG. 3.

As shown more in detail in FIG. 4, the adapter 23B of the grounded device 20B, connected in a bidirectional manner to the ethernet backbone network 14 and to the decoupler 22B, comprises at least one PLC module 25B and a management module 26B of said PLC module 25B, said management module 26B essentially acting as a gateway. The adapter 23B is a PLC master device being directly connected to the ethernet backbone network 14 and thus to one or more remote control center(s) connected thereto.

Furthermore, the decoupler 22B comprises a pair of input terminals P1 which receive an input signal or native signal, being affected by noise, in particular low frequency interferences, and is configured so as to decouple the continuous traction voltage and provide a high-pass filter which is also able to eliminate the noise at low frequencies and obtain an information signal, which is correct and usable for the transmission towards the onboard device 20A, on a pair of output terminals P2.

Suitably, the architecture for a data transmission 10 according to the present invention comprises a plurality of grounded devices 20B including the adapter 23B with its PLC module 25B and its management module 26B and the decoupler 22B.

The decoupler 22A of the onboard device 20A has a structure corresponding to the one of the decoupler 22B of the grounded device 20B and carries out an analogous high-pass filtering operation on the received signals.

It should be in fact noted that, while an electric traction vehicle is operating, electromagnetic noises due to the presence of electric motors for the traction of the vehicle, of the onboard electric apparatuses (air-conditioning system, chopper for adjusting the direct current, etc.), as well as noises/interferences introduced by external systems may arise.

According to the present invention, the decouplers 22A and 22B of the onboard device 20A and of the grounded device 20B, respectively, use an operating band between 2 MHz and 50 MHz, more preferably between 12 MHz and 30 MHz, in order to avoid noises and interferences indicated above.

The adapter 23A of the onboard device 20A instead comprises at least one pair of PLC modules 25A1, 25A2 of different type connected to a management module 26A acting as a gateway. Suitably, the PLC modules 25A1, 25A2 are adapted to send diagnostic data of the onboard device 20A, in particular in terms of connection quality, to the management module 26A which, as will be clarified in the following, allows to carry out the so-called handover, that is the passage from a grounded device 20B to another one during the movement of the related vehicle 12, independently from a travel direction of said vehicle. The PLC modules 25A1, 25A2 of the adapter 23A of the onboard device 20A are configured as PLC slave devices.

Suitably according to the present invention, the communication between the onboard device 20A and a grounded device 20B is guaranteed for a distance comprised between 1 m and 1500 m. A suitable number of grounded devices 20B is thus provided along the transport network 11 in order to guarantee a safe and constant transmission.

Taking into account the Italian railway network, which comprises lines about 20 km long, it is possible to guarantee a constant and safe communication positioning a grounded device 20B each 200 m along the tracks 13, the adapter 23A of the onboard device 20A of each vehicle 12 allowing the passage from a grounded device 20B to a following one.

Figure 5:
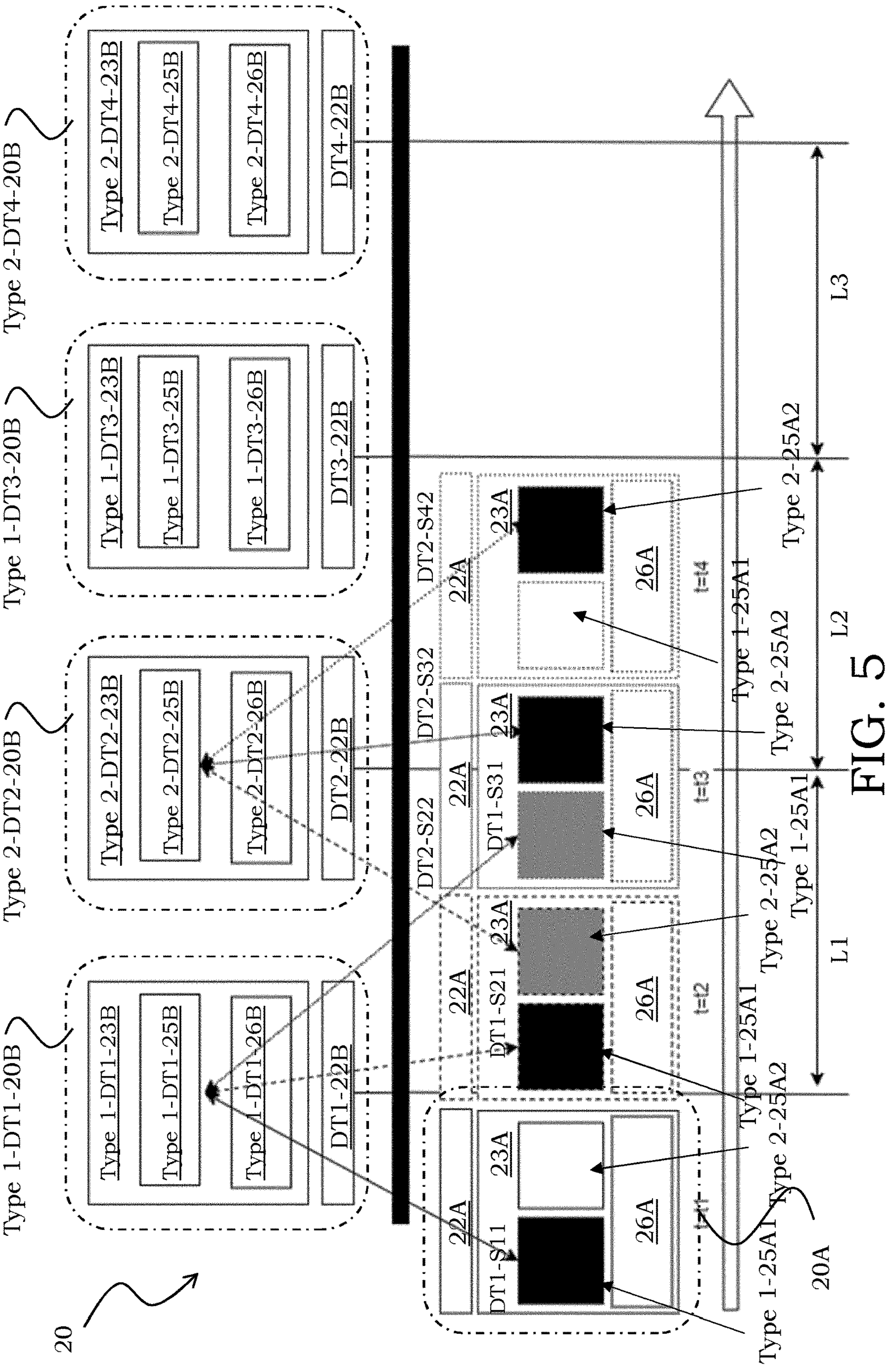

The operating mode of the transmission and decoupling system 20 with the handover between a grounded device and another one while a vehicle 12 is moving is schematically illustrated in FIG. 5.

In this figure, the transmission and decoupling system 20 particularly comprises four grounded devices 20B each comprising a decoupler 22B and an adapter 23B, each in turn comprising a PLC module 25B and a management module 26B, as well as an onboard device 20A, in particular installed on a moving vehicle 12 and shown at different times t=t1, t=t2 e t=t3.

As previously explained and illustrated in FIG. 5, each onboard device 20A comprises a pair of PLC modules 25A1, 25A2 connected to a management module 26A.

For the correct data transmission, the PLC modules of the grounded devices 20B are divided into a first type, indicated as Type 1, and a second type, indicated as Type 2 and are alternating with each other. Analogously, the onboard device 20A comprises a first PLC module of the first type and a second PLC module of the second type.

In particular, in the example illustrated in FIG. 5, the transmission and decoupling system 20 comprises a first grounded device of the first type, indicated as Type 1-DT1-20B, a second grounded device of the second type, indicated as Type 2-DT2-20B, a third grounded device of the first type, indicated as Type 1-DT3-20B and a fourth grounded device of the second type, indicated as Type 2-DT4-20B. More in Particular:

- the first grounded device of the first type Type 1-DT1-20B comprises a decoupler DT1-22B and an adapter Type 1-DT1-23B in turn including a PLC module of the first type Type 1-DT1-25B and a corresponding management module Type 1-DT1-26B;
- the second grounded device of the second type Type 2-DT2-20B comprises a decoupler DT2-22B and an adapter Type 2-DT2-23B in turn including a PLC module of the second type Type 2-DT2-25B and a corresponding management module Type 2-DT2-26B;
- the third grounded device of the first type Type 1-DT3-20B comprises a decoupler DT3-22B and an adapter Type 1-DT3-23B in turn including a PLC module of the first type Type 1-DT3-25B and a corresponding management module Type 1-DT3-26B;
- the fourth grounded device of the second type Type 2-DT4-20B comprises a decoupler DT4-22B and an adapter Type 2-DT4-23B in turn including a PLC module of the second type Type 2-DT4-25B and a corresponding management module Type 2-DT4-26B.

The onboard device 20A analogously comprises a decoupler 22A and an adapter 23A, in turn including a first PLC module of the first type Type 1-25A and a second PLC module of the second type Type 2-25B as well as a management module 26A.

Suitably, the first PLC module of the first type Type 1-25A of the onboard device 20A can only communicate with modules of the first type of the grounded devices 20B, in the example the PLC module of the first type Type 1-DT1-25B of the first grounded device Type 1-DT1-20B and the PLC module of the first type Type 1-DT3-25B of the third grounded device Type 1-DT3-20B and the second PLC module of the second type Type 2-25A of the onboard device 20A can only communicate with modules of the second type of the grounded devices 20B, in the example the PLC module of the second type Type 2-DT2-25B of the second grounded device Type 2-DT2-20B and the PLC module of the second type Type 2-DT4-25B of the fourth grounded device Type 2-DT4-20B.

The grounded devices 20B are placed at intervals with respect to each other according to the distances L1, L2, L3, preferably equal to each other. In particular, said distances are decided based on a minimum signal/noise ratio necessary used as link quality parameter for obtaining a throughput required by the particular application which uses this type of communication, such as for example voice, data, etc. and are according to the type of power supply network of the architecture for a data transmission 10, such as for example overhead railway or tramway contact line, or third rail power supply, to name a few. For example, in order to guarantee 2 Mbps of throughput for a power supply network with overhead contact line, it can be verified that the maximum distance between the two grounded devices 20B is approximately equal to 700 m. In this way, the grounded devices 20B, including adapters 23B being PLC master devices with master PLC modules 25B of different types, alternate one another, so forming a PLC Network on the overhead railway or tramway contact line.

More in detail, referring to the simplified embodiment shown in FIG. 5, when the vehicle 12, and thus its onboard device 20A, is in a first position corresponding to a first time t=t1, the first PLC module of the first type Type 1-25A1 of the onboard device 20A is only connected to the PLC module of the first type Type 1-DT1-25B of the first grounded device Type 1-DT1-20B communicating a signal DT1-S11, which has a signal/noise ratio which is enough to guarantee a bidirectional data exchange between onboard device 20A and first grounded device Type 1-DT1-20B. In particular, the communication occurs between the first PLC module of the first type Type 1-25A1 of the onboard device 20A and the PLC module of the first type Type 1-DT1-25B connected to the decoupler 22B of the first grounded device Type 1-DT1-20B.

At a second time t=t2, the first PLC module of the first type Type 1-25A1 of the onboard device 20A continues to communicate a signal DT1-S21 with the PLC module of the first type Type1-DT1-25B of the first grounded device Type 1-DT1-20B. At the same time t=t2, the second PLC module of the second type Type 2-25A2 of the onboard device 20A is associated, that is it communicates a signal DT2-S22 to the PLC module of the second type Type 2-DT2-25B of the second grounded device Type 2-DT2-20B. Suitably, according to the present invention, the bidirectional data transmission only occurs between the first PLC module of the first type Type 1-25A1 of the onboard device 20A and the PLC module of the first type Type 1-DT1-25B of the first grounded device Type 1-DT1-20B, since only the first signal DT1-S21 has a signal/noise ratio which is enough to guarantee the connection with the onboard device 20A and the correct bidirectional data transmission towards the ethernet backbone network 14.

Furthermore, at a third time t=t3, the first PLC module of the first type Type 1-25A1 of the onboard device 20A is able to communicate a signal DT1-S31 to the PLC module of the first type Type 1-DT1-25B of the first grounded device Type 1-DT1-20B. At the same time t=t3, the second PLC module of the second type Type 2-25A2 of the onboard device 20A is able to send a second signal DT2-S32 to the PLC module of the second type Type 2-DT2-25B of the second grounded device Type 2-DT2-20B. Suitably, according to the present invention, the bidirectional data transmission occurs in that case between the second PLC module of the second type Type 2-25A2 of the onboard device 20A and the PLC module of the second type Type 2-DT2-25B of the second grounded device Type 2-DT2-20B, since the signal DT2-S32 has a signal/noise ratio which is enough to guarantee the bidirectional data transmission with onboard device 20A and is higher than the signal/noise ratio of the signal DT1-S31. Thereby, the handover is carried out between the first grounded device Type 1-DT1-20B and the second grounded device Type 2-DT2-20B.

Finally, at a fourth time t=t4, the second PLC module of the second type Type 2-25A2 of the onboard device 20A is only connected to the PLC module of the second type Type 2-DT2-25B of the second grounded device Type 2-DT1-20B, by a signal DT2-S42, which has a signal/noise ratio which is enough to guarantee a bidirectional data exchange with the ethernet backbone network 14.

It should be underlined that the slave PLC modules 25A1, 25A2 of the adapters 23A of the onboard devices 20A are able to connect directly to the master PLC modules 25B of the adapters 23B of the grounded devices 20B, according to the alternation of their types, without needing repeaters of any kind to be provided.

Essentially, the onboard device 20A verifies the connection signals between the reachable grounded devices 20B at any time and chooses the one with a signal/noise ratio adequate to the data transmission.

It is pointed out how, advantageously according to the present invention, the architecture for a data transmission 10 guarantees a constant and safe transmission between vehicles 12 and ethernet backbone network 14 and can be therefore used for transmitting any type of data and in particular:

- critical data, that is data necessary for the correct working of the vehicle, such as for example desk driver data, motor control data, brake control data, track signals, power electronics signals, safety signals, to name a few;
- non-critical data, that is data which are not necessary for the correct working of the vehicle, but connected to a better comfort of the onboard passengers, that is for example information about the passengers, the diagnostic data of the vehicle, the audiovisual entertainment signals.

Moreover, the PLC modules of the adapters 23A, 23B are able to exchange diagnostic data tied to the connection quality with the management modules 26A, 26B so as to allow the handover between grounded devices 20B, in particular between one master PLC module 25B to another one, in particular using as link quality parameter the signal/noise ratio, as above explained.

Advantageously according to the present invention, the handover mechanism can be also tied to the additional link quality parameters, being provided to the management modules 26A, 26B. For instance, the connection between onboard devices and grounded devices can be also based on:

- authentication status of the master and/or slave PLC modules;
- RSSI (Received Signal Strength Indication) of a special signal, called beacon frame, between a master PLC module and a slave PLC module;

AGC (Automatic Gain Control) on the so called RxPGA, i.e. the receiver's programmable gain amplifier, being used to compensate the amplitude of the signal received from the receiver; and

- physical data rate based on the data dynamically exchanged on an estimated channel between a master PLC module and a slave PLC module, which is a variable parameter based on the transmission conditions.

According to another embodiment, several handover rules can be used to drive the handover mechanism and in particular:

- the time of evaluation of the link quality parameters;
- the time between two scans, i.e. the frequency of information retrieved from slave modules of the grounded devices 20B (eg: 250 ms) and roaming estimation;
- the no-return delay, being the minimum delay before returning to an already used master module; and
- the smoothing factor, i.e. the weighing importance of latest signals vs older ones.

Different combination of the above indicated handover rules can be used on the basis of the application field, in particular when the architecture is used in a railway or tramway or any other possible scenario.

It should be also remarked that the handover mechanism at the grounded devices 20B of the proposed architecture is a level 2 switchover mechanism wherein two master modules are simultaneously connected to two on board PLC modules and the active communication channel is switched between the on board PLC modules at the level 2 of the ISO/OSI stack.

To conclude, advantageously according to the present invention, the architecture for a data transmission allows to use the electric power supply line which transmits the electric traction energy to the vehicles circulating in a transport network in order to establish a bidirectional connection between vehicles and remote control center, thanks to the use of the BPLC communication mode (Broadband over Power Lines Communication).

Suitably, the architecture for a data transmission according to the present invention has low installations costs, since it does not need additional antennas, and low maintenance costs thanks to the use of components (decouplers, adapters) with a high average breaking time.

The energy saving which the architecture for a data transmission according to the present invention allows to obtain is extremely significant. Taking into account, by way of example, only one underground line of 20 Km consisting of 20 stations and 22 trains, the energy consumption of the currently implemented solutions, which require transmission boxes with antennas each 400 m and use Wi-Fi radio transmissions onboard the train, is equal to 21.19 KW, while the architecture for a data transmission with the BPLC communication mode, having grounded devices installed each 700 m and onboard radio transmissions, has a consumption equal to 1.15 KW, that is an energy saving equal to 94.5%.

Finally, it should be pointed out that, advantageously according to the present invention, the architecture for a data transmission as proposed has a high scalability, since it can be expanded according to the needs of the transport network infrastructure, which can thus grow proportionally to the size and the coverage needs.

Obviously, a person skilled in the art, in order to satisfy contingent and specific needs, will be able to make various modifications and variations to the architecture described above, all included in the scope of protection of the invention as defined by the following claims.

The invention claimed is:

1. An architecture configured to transmit data between a plurality of electric traction vehicles moving in a transport network, which comprises a plurality of substations connecting with a low/medium voltage power supply network for the vehicles and a backbone ethernet network, the architecture comprising:

a transmission and decoupling system being inserted between the vehicles and substations connecting with the power supply network being used for a continuous data transmission according to the BPLC communication mode on the vehicles and the backbone ethernet network, the transmission and decoupling system comprising:

an onboard device adapted to be placed onboard each vehicle and configured to connect to one of the grounded devices when the vehicles transit in correspondence of the grounded device; and a plurality of grounded devices, each grounded device adapted to be coupled to at least one of the substations, wherein each of the grounded devices comprises an adapter, which is directly connected to the ethernet backbone network and is a PLC master device; and the onboard device of each vehicle comprising an adapter being a PLC slave device.

2. The architecture of claim 1, wherein the onboard device is connected to the grounded device based on a signal/noise ratio adapted to guarantee a bidirectional communication with the ethernet backbone network.

3. The architecture of claim 2, wherein the onboard device is connected to the grounded device based on additional link quality parameters selected from the group consisting of: an authentication status of master and/or slave PLC modules, RSSI (Received Signal Strength Indication) of a beacon frame between a master PLC module and a slave PLC module, an AGC (Automatic Gain Control) on a RxPGA (Receiver's Programmable Gain Amplifier), being used to compensate an amplitude of a signal received from the receiver, and a physical data rate based on the data dynamically exchanged on an estimated channel between a master PLC module and a slave PLC module.

4. The architecture of claim 3, further comprising a plurality of grounded devices of a first type and a plurality of grounded devices of a second type which are alternating and spaced with respect to each other according to a distance.

5. The architecture of claim 4, wherein each of the grounded devices of the first type comprises at least one adapter, in turn including a PLC module of the first type and a corresponding management module which is able to connect to the first PLC module of a first type of the adapter of the onboard device and each of the grounded devices of the second type comprises at least one adapter, in turn including a PLC module of the second type and a corresponding management module which is able to connect to the second PLC module of a second type of the adapter of the onboard device.

6. The architecture of claim 5, wherein the grounded devices of the first type and of the second type respectively comprise a management module connected to the PLC modules of the first type and the second type.

7. The architecture of claim 4, wherein each of the grounded devices comprises a decoupler adapted to eliminate a continuous component from a power supply voltage and provide a high-pass filter to eliminate low frequency noise in an input signal and obtain an information signal to be transmitted to the onboard device.

8. The architecture of claim 1, wherein the adapter includes at least one first PLC module of a first type and a second PLC module of a second type connected to a management module acting as a gateway, the adapter being adapted to convert digital data in an analog radiofrequency signal and being connected to a low/medium voltage local power supply line of the vehicle and to the grounded device when connected to the onboard device.

9. The architecture of claim 8, wherein that the onboard device of each vehicle further comprises a decoupler adapted to eliminate a continuous component of a power supply voltage on the local power supply line and to provide a high-pass filter to eliminate low-frequency noise in an input signal and obtain an information signal to be transmitted to the grounded device when connected to the onboard device, enabling a connection with the power supply network and a data transmission according to the BPLC communication mode towards the backbone ethernet network.

10. The architecture of claim 1, wherein the onboard device is connected to a local network of the vehicles.

11. The architecture of claim 1, wherein the substations are selected from a group consisting of: railway or tramway stations, railway or tramway stops, electrical substations of railway or tramway networks, additional structures positioned along railway or tramway lines.

12. The architecture of claim 1, wherein the vehicles are selected from a group consisting of: trains, trolleybus, trams and other electric traction transport means.

13. The architecture of claim 1, wherein the grounded devices are placed at a distance of between 1 m and 1500 m from the onboard devices of the vehicles.

14. The architecture of claim 1, carrying out a data handover from a grounded device to a following one by verification of a minimum value of signal/noise ratio transmitted between the grounded device and the onboard device.

15. The architecture of claim 1, transmitting:

critical data, that is data which are necessary for a correct working of the vehicles and the transport network as a whole; and non-critical data, that is data connected to an improved passengers comfort onboard the vehicles.

16. A method for the continuous data transmission in an architecture configured to transmit data between a plurality of electric traction vehicles moving in a transport network, which comprises a plurality of substations connecting with a low/medium voltage power supply network for the vehicles and a backbone ethernet network, the architecture comprising: a transmission and decoupling system being inserted between the vehicles and substations connecting with the power supply network being used for a continuous data transmission according to the BPLC communication mode on the vehicles and the backbone ethernet network, the transmission and decoupling system comprising: an onboard device adapted to be placed onboard each vehicle and being configured to connect to one of the grounded devices when the vehicles transit in correspondence of the grounded device; and a plurality of grounded devices, each grounded device being adapted to be coupled to at least one of the substations, each of the grounded devices comprises at least an adapter, which is directly connected to the ethernet backbone network and is a PLC master device; and the onboard device of each vehicle comprises an adapter being a PLC slave device, wherein the grounded devices are divided and alternating with respect to each other between a first type and a second type, each device type being adapted to be connected to a distinct module of the onboard device, the method comprising the steps of:

transmitting a signal from each of the modules of the onboard device towards grounded devices of a same type;

verifying a signal/noise ratio value of the transmitted signals as link quality parameter;

selecting a signal with a maximum value of signal/noise ratio among the transmitted signals; and connecting one of the modules of the onboard device with one of the grounded devices which correspond to the signal with maximum value of signal/noise ratio, the above steps being repeated in following times while the vehicle is moving in order to guarantee the continuous data transmission.

17. The method of claim 16, wherein additional link quality parameters are used to evaluate the grounded device to be connected to one of the modules of the onboard device.

18. The method of claim 17, wherein the additional link quality parameters are selected from a group consisting of: an authentication status of master and/or slave PLC modules, RSSI (Received Signal Strength Indication) of a beacon frame between a master PLC module and a slave PLC module, an AGC (Automatic Gain Control) on a RxPGA (Receiver's Programmable Gain Amplifier), being used to compensate an amplitude of a signal received from the receiver, and a physical data rate based on the data dynamically exchanged on an estimated channel between a master PLC module and a slave PLC module.

19. The method of claim 18, wherein several handover rules are used to drive the handover mechanism selected from a group consisting of:

a time of evaluation of the link quality parameters;

a time between two scans, being a frequency of information retrieving from slave modules of grounded devices and roaming estimation;

a no-return delay, being a minimum delay before returning to an already used master module; and a smoothing factor, being a weighing importance of latest signals vs older ones.

20. The method of claim 19, wherein different combination of the handover rules and additional link quality parameters are used on the basis of the application scenario.

* * * * *